United States Patent [19]

Dunhill et al.

[11] 4,091,494
[45] May 30, 1978

[54] WINDOW WIPER ASSEMBLIES FOR VEHICLES

[75] Inventors: Geoffrey Dunhill, Worksop; Edgar R. Halstead, Doncaster, both of England

[73] Assignee: International Harvester Company, Chicago, Ill.

[21] Appl. No.: 691,645

[22] Filed: June 1, 1976

[30] Foreign Application Priority Data

May 30, 1975 United Kingdom ............... 23573/75

[51] Int. Cl.² .............................................. B60S 1/04
[52] U.S. Cl. ............................... 15/250.16; 15/250.19
[58] Field of Search ................. 15/250, 250.16–250.28

[56] References Cited

U.S. PATENT DOCUMENTS

| | | | |
|---|---|---|---|
| 1,787,894 | 1/1931 | Burke ................................ | 15/250.16 |
| 1,826,672 | 10/1931 | Oishei ................................ | 15/250.16 |
| 3,019,468 | 2/1962 | Hatch ................................ | 15/250.19 |
| 3,107,383 | 10/1963 | Carpenter et al. ............. | 15/250.16 X |
| 3,110,920 | 11/1963 | Dangler ........................ | 15/250.19 X |
| 3,112,510 | 12/1963 | Forbush et al. .............. | 15/250.16 X |

FOREIGN PATENT DOCUMENTS

281,647   1/1929   United Kingdom ............... 15/250.19

*Primary Examiner*—Peter Feldman
*Attorney, Agent, or Firm*—Raymond E. Parks; Frederick J. Krubel; F. David AuBuchon

[57] ABSTRACT

A window wiper assembly for a vehicle cab which has a window sash or window surround that opens either by raising and tilting or by removing the window sash. The wiper assembly includes a cam which guides the wiper arm from an operative position, where the wiper blade contacts the windowpane, to an unoperative position, where the wiper blade is moved away from the surface of the windowpane and is disposed in an out of the way position relative to the window sash to permit the opening of the window sash. A switch is also provided which senses the open window and prevents actuation of the wiper assembly.

2 Claims, 2 Drawing Figures

WINDOW WIPER ASSEMBLIES FOR VEHICLES

BACKGROUND OF THE INVENTION

This invention relates to a window wiper assembly for a vehicle and to a vehicle provided with such assembly.

FIELD OF THE INVENTION

Ventilation of several types of vehicles currently in use can be achieved by removing one or more of the windows from their window sashes or surrounds or by pivoting the window sash about a horizontal hinge axis. In one specific instance, the whole of the rear window sash of a tractor cab is moveable to a position adjacent the roof of the cab in the manner of an up and over garage door.

DESCRIPTION OF THE PRIOR ART

In order to keep these windows clear of dust and rain it has been customary to mount a window wiper drive on a window sash or surround and to arrange for the drive to move a wiper blade back and forth across the windowpane. Such an arrangement is normally provided with a manually operable parking knob which is connected directly to the wiper drive and can be turned by hand to move the wiper blade off of the windowpane and sash and onto the window frame when it is desired to open the window sash. One of the principal disadvantages of this arrangement is that if the vehicle operator forgets to move the wiper blade onto the window frame prior to opening the window sash, the wiper blade and the wiper arm and its biasing spring can be severely damaged.

SUMMARY OF THE INVENTION

According to the present invention there is provided a window wiper assembly for a vehicle which assembly comprises a windowpane, a window sash or surround supporting the windowpane, a window frame supporting and surrounding the sash, a wiper drive mounted on said window frame, a wiper blade, a wiper arm carrying said wiper blade and connected to said wiper drive, and a control which in an "on" position will cause said drive to move said wiper arm and blade back and forth across said windowpane and which in an "off" position will cause said drive to park the wiper blade on the window sash.

In general, each windowpane is surrounded by a weather-seal (typically an upstanding rubber seal) and/or a metal sill. It will be appreciated that a wiper blade could easily be damaged by repeatedly being dragged over such a weather-seal and/or metal sill. This problem is particularly acute in the prior art arrangement described hereinbefore. In order to reduce this problem, a cam may be provided on the vehicle cab or on the window frame which will cooperate with the wiper blade or wiper arm to lift the wiper blade away from the weather-seal or similar obstacle as it moves to a parked or inoperative position. Whilst it is preferable to arrange for the cam to act on the wiper arm to lift the wiper blade clear of any obstruction an arrangement in which the cam acts anywhere on the wiper blade or wiper arm to relieve contact pressure between the wiper blade and weather-seal or similar obstruction and inhibit damage to the wiper blade is within the scope of the present invention.

If desired the cam may be shaped to support the wiper arm in an out of the way parked position relative to the moveable window sash. This feature is of particular advantage when the wiper drive is situated above the window sash. If desired one or both the engaging surfaces of the cam and wiper arm can be provided with a coating of high lubricity, for example polytetrafluorethylene.

In order to inhibit the window wiper drive being actuated when the window sash is open, the present invention also contemplates providing a trip which, when said window is open, inhibits said window wiper drive being actuated. This feature is particularly important in vehicles where the whole rear window sash can be removed since accidental actuation of the wiper drive at such a time could result in the operator being seriously injured by the wiper arm.

BRIEF DESCRIPTION OF THE DRAWING

For a better understanding of the present invention reference will now be made, by way of example, to the various figures accompanying drawing in which.

DESCRIPTION OF THE PREFERRED EMBODIMENT

Figure 1:
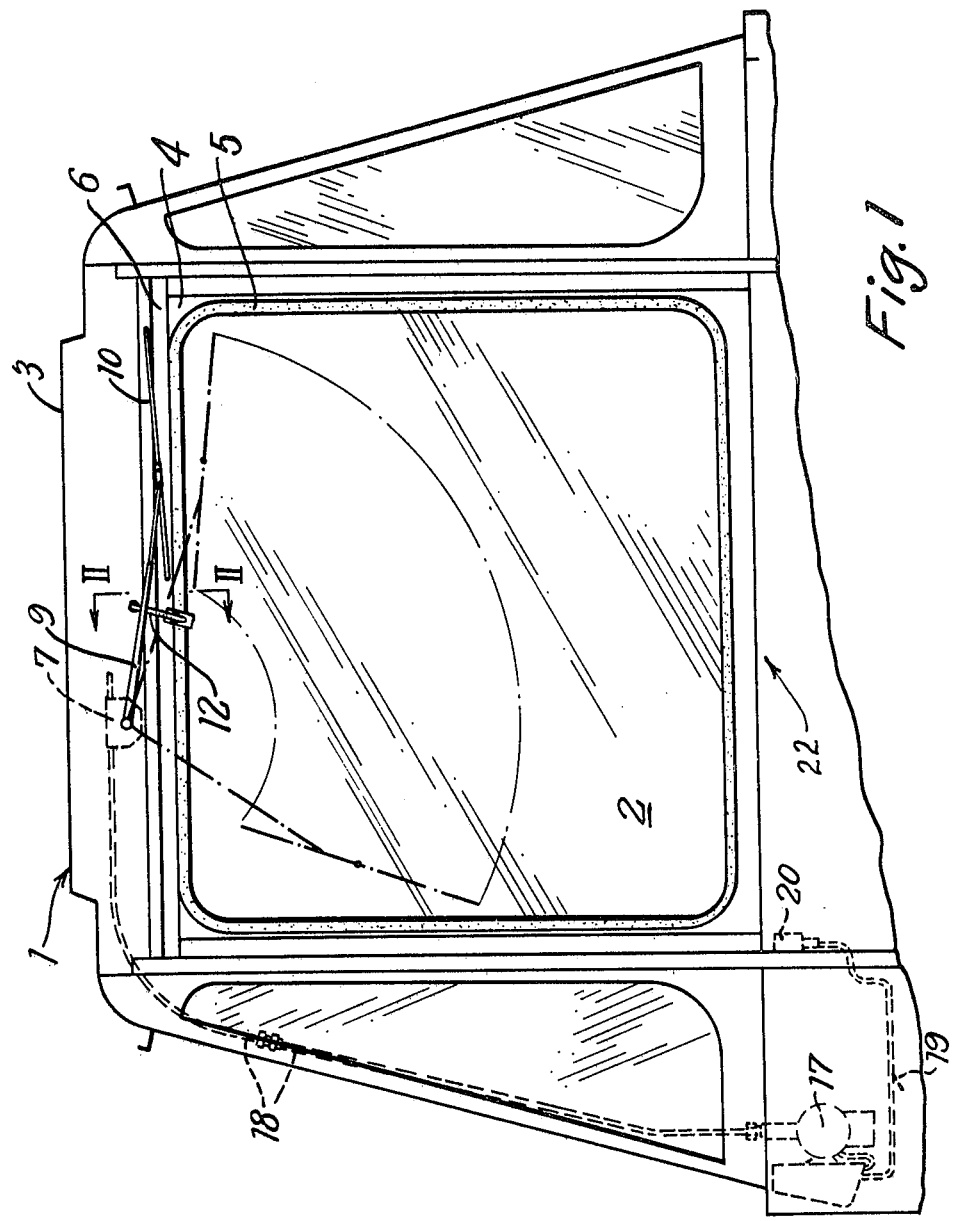
FIG. 1 is a rear view of part of a tractor cab in accordance with the present invention.
Figure 2:
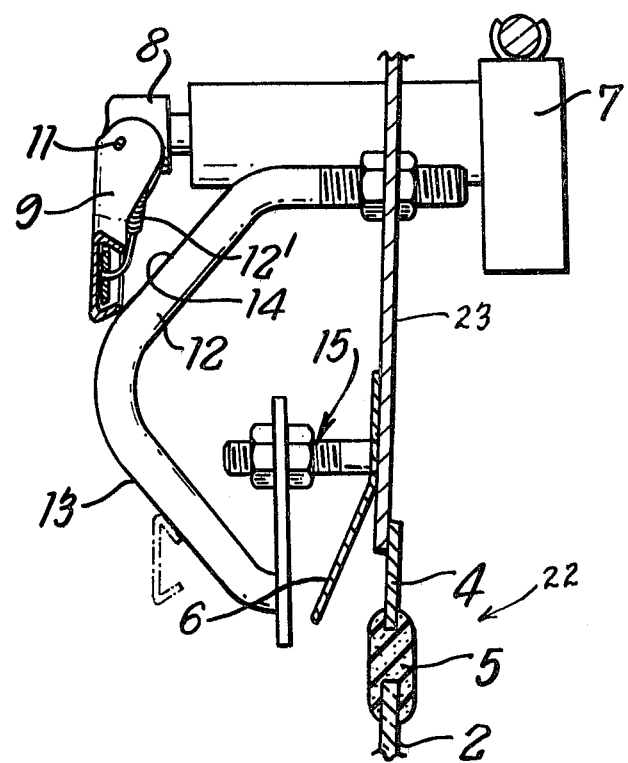
FIG. 2 is a view taken along line II—II of FIG. 1.

Referring to the drawing there is shown in FIG. 1 part of a tractor cab which is generally identified by reference numeral 1. The tractor cab 1 has an opening for a window assembly 22 having a window sash 4 which can be removed or moved to a position parallel with the roof 3 of the cab by a mechanism similar to that disclosed in the International Harvester Company of Great Britain, Ltd. co-pending British Application No. 18157/72 which was accepted and published on Mar. 17, 1976 under Final Number 1,428,655. The windowpane 2 is housed in a window sash 4 which carries a weather-seal 5. A metal sill 6 projects outwardly over the top edge of the window sash 4 and prevents rain from entering through the clearance between the window frame 23 and the top of the window sash 4. A wheel box 7, is mounted on the window frame 23 directly above the window sash 4 and the metal sill 6 and has a splined drive shaft (not shown) on which is mounted a coupling 8. A wiper arm 9 which carries a wiper blade 10 is pivotably mounted on the coupling 8 by a pivot pin 11. A spring 12' acts between the coupling 8 and the wiper arm 9 to bias the wiper blade 10 against the windowpane 2 in the "on" or operative position of the wiper assembly.

A cam 12 is mounted on the window frame 23 above the sash 4. The cam 12 has a first outwardly inclined surface 13 and a second inwardly inclined surface 14 merging together in a gentle peak. Both cam surface means 13 and 14 are coated with a layer of polytetrafluorethylene. An assembly 15 is provided whereby the position of cam 12 with respect to the window sash 4 can be adjusted.

The wheel box 7 is connected to a wiper motor 17 by tubes 18 which house a flexible rack (not shown). In use, the wiper motor 17 causes the flexible rack to move back and forth in the tubes 18 which in turn oscillates drive wheels (not shown) in the wheel box 7.

A switch 19 is located on the wall of the tractor cab 1 and has an "on" position in which the wiper arm 9 and blade 10 moves back and forth across the windowpane 2 and an "off" position in which the wiper arm 9 engages and moves upwardly along the guide means or surface 13 of cam 12. As the wiper arm 9 moves up the surface 13, the wiper blade 10 is lifted away from the windowpane 2 and sash 4 by a distance sufficient to prevent the wiper blade 10 coming into contact with either the weather-seal 5 or the metal sill 6. The wiper motor 17 then parks the wiper arm 9 on the second guide means or cam surface 14. It will be noted that the second cam surface 14 supports the wiper arm 9 in an out of the way position relative to the window sash to permit the opening of the window.

In order to prevent the wiper motor 17 being actuated when the window 22 is open, the wiper motor 17 is associated with a trip or switch 20 which when the window 22 is open, opens to inhibit the wiper motor 17, and when the window 22 is closed, closes to allow the wiper motor 17 to be actuated.

The embodiments of the invention in which an exclusive property or priviledge is claimed are defined as follows:

1. A window wiper assembly in combination with a vehicle cab, the vehicle cab having an opening forming a window, a window frame carried in the opening, a sash including a windowpane framed in the sash supported by the frame and being moveable relative thereto for opening and closing the window, and the window wiper assembly having a wiper drive supported on the window frame above the sash, a wiper arm having one end connected to the wiper drive and a swingable end connected to a wiper blade, wherein the improvement comprises:

a cam supported on the frame above the sash and laterally spaced from the wiper drive, the cam having a first cam surface means connected to the frame engageable with the wiper arm upon upward swinging of the wiper arm to an inoperative position for lifting the wiper blade off of the windowpane, and having a second cam surface means connected to the frame for supporting the wiper arm after further upward swinging of the wiper arm to a parked position and for disposing the wiper blade in an out of the way position relative to the sash to permit the opening of the window without interference with the wiper blade; and wherein the first cam surface has a lower end connected to the frame and disposed laterally adjacent to the top of the sash and extending upwardly and outwardly therefrom and forming a guide means for the wiper arm for lifting the wiper blade from the windowpane and elevating same over the sash, and the second cam surface has an upper end connected to the frame and extending downwardly and outwardly therefrom and merging with the first cam surface means at a gentle peak forming a second guide means for the wiper arm for maintaining the wiper arm past the peak and at a raised position over the sash; and wherein the lower end of the first cam surface is connected to a plate having an opening, and further including lateral and angular adjusting means carried on the frame and passing through the opening in the plate for laterally spacing the plate from frame and angularly adjusting the lower end of the first cam surface about the connection of the upper end of the second cam surface to the frame, the lateral and angular adjusting means further including locking means for locking the cam in the selected lateral and angular position.

2. The invention as claimed in claim 1 wherein the lateral and angular adjusting means including the locking means comprises a stud bolt connected to the frame and passing through the opening in the plate and a pair of locking nuts on opposite sides of the plate fastening the plate to the bolt and wherein the upper end of second cam surface means is cylindrical and is provided with screw threads, and the frame is provided with an aperture to receive the threaded end of the second cam surface, and further including a pair of locking nuts on opposite sides of the frame about the aperture fastening the threaded end to the frame.

* * * * *